US006330594B1

(12) United States Patent
Swart

(10) Patent No.: US 6,330,594 B1
(45) Date of Patent: Dec. 11, 2001

(54) MULTIPLE TIER INTERFACING WITH NETWORK COMPUTING ENVIRONMENT

(75) Inventor: Marius Swart, Basking Ridge, NJ (US)

(73) Assignee: CyberShift Holdings, Inc., Parsippany, NJ (US)

(*) Notice: Subject to any disclaimer, the term of this patent is extended or adjusted under 35 U.S.C. 154(b) by 0 days.

(21) Appl. No.: 09/144,009

(22) Filed: Aug. 31, 1998

Related U.S. Application Data

(60) Provisional application No. 60/056,025, filed on Sep. 2, 1997.

(51) Int. Cl.[7] .......... G06F 15/16
(52) U.S. Cl. .......... 709/219; 709/203; 709/217
(58) Field of Search .......... 709/203, 217, 709/219

(56) References Cited

U.S. PATENT DOCUMENTS 6,052,785 * 4/2000 Lin et al. .......... 713/201
6,151,602 * 11/2000 Hejisberg et al. .......... 707/10

OTHER PUBLICATIONS

"Cross–Platform Framework Garners Widespread Support as Industry Strives to Maintain Open Internet Standards" dated Oct. 1, 1996; pp. 1–3.
"Novell Embraces Oracle Network Computing Architecture"; Novell's support of Network Computing Architecture, Oct. 1, 1996/Version 1.0, pp. 1–5.
"Network Computing Architecture, Cartridge Developer Resources", pp. 1–2.
"Network Computing Architecture Questions and Answers, " Jun. 24, 1997; pp. 1–9.
"Oracle Developer Programme, Network Computing Architecture Questions and Answers"; Sep. 27, 1996.
"Network Computing Architecture™, An Oracle Technical White Paper" dated Jun., 1997, pp. 1–16.
Brochure, Amano CS–500N Series.

* cited by examiner

*Primary Examiner*—Krisna Lim
(74) *Attorney, Agent, or Firm*—Lerner, David, Littenberg, Krumholz & Mentlik, LLP

(57) ABSTRACT

A computer-based system and method for enabling remote access to and control of a data acquisition system via a computer network having a multi-tiered network computing platform. The system includes a data acquisition system with a plurality of data acquisition devices; a database server; an application server; a data acquisition server; and two or more client terminals. The multi-tiered network computing platform is provided for the servers and includes a client tier, an application tier and a database tier. One or more client cartridges, application cartridges and data cartridges are provided on the servers and client terminals and are adapted to interface with each of the respective tiers of the network computing platform. The cartridges can communicate with one another over a common communications bus such that the client terminals can remotely access, control and manipulate data from the data acquisition system from any client location connected to the computer network.

22 Claims, 3 Drawing Sheets

MULTIPLE TIER INTERFACING WITH NETWORK COMPUTING ENVIRONMENT

CROSS-REFERENCE TO RELATED APPLICATIONS

The present application claims the benefit of U.S. Provisional Patent Application Ser. No. 60/056,025 filed Sep. 2, 1997, the disclosure of which is incorporated herein by reference.

FIELD OF THE INVENTION

The present invention relates to network computing, and more particularly to a method and apparatus for interfacing with, controlling and accessing real-time data acquisition systems with multi-tiered, cross-platform network computing environments.

BACKGROUND OF THE INVENTION

It has been said that the next generation of computing will be in the form of "network computing." One reason for this prediction is that network computing moves the complexity of applications off of an individual's desktop computer and onto networks and network-based servers which provide more powerful computing and better adapted to running complex programs and applications. Network computing also allows universal and immediate access to applications and information from many users or "clients" from multiple locations, through connections such as linked area networks (LANs), wide area networks (WANs), intranets or from any computer connected to the Internet. Network computing also allows programming advantages such as modular development of software and applications through software components and task-specific modules that can be re-used in different applications and further built upon.

In typical client/server networks, multiple computers known as "clients"are connected to a network and can each access and manipulate data stored at a "server" computer or computers. Clients/server networks, however, typically suffer from a number of drawbacks including the fact that clients must be directly connected to the network in order to access the server. That is to say, most networks are only accessible by a client directly connected to the network within the company or business and are not readily accessible from remote locations outside of the company.

While remote access capability is usually possible, such as dialing in from an outside modem to connect to an internal modem, the remote connection is typically slow and not a satisfactory substitute for accessing the server directly. Another problem with client/server networks is that they are typically provided on a single platform or operating system such that there is difficulty interfacing computers of different platforms or operation systems.

The rapid growth of the Internet and the World Wide Web has dramatically increased awareness and desirability of moving computer networks and information systems onto the Internet, perhaps the ultimate network computing environment. With easy-to-use Web browser software and GUI interfaces, computers connected to the Internet can now instantly gain access to applications and information from virtually anywhere in the world.

Today, to facilitate movement towards a network computing environment, a number of companies are developing and offering multi-tiered, open-platform network computing environments. Such an environment combines features and applications from existing areas of computing including client/server, the Internet and the Web, and distributed object systems in which different components and objects comprising an application can be located on different computers connected to a network. One such network computing environment is a multi-tiered computing environment known as Network Computing Architecture ("NCA") offered by Oracle Corporation. Such computing environments are advantageous since they can manage large amounts of data delivered across a network, such as the Internet, to a large number of clients in a reliable, secure and economical fashion.

Multi-tiered network computing environments, such as Oracle's NCA, provide multiple modules or tiers which accept discrete software programs known as "cartridges" which are specifically written for each module. With NCA, for instance, there is provided three distinct tiers, including a universal data server, an application server, and a universal client. The universal data server provides for file and data management. The application server provides an industry-standard application server, including "listener-independent" application development and deployment environment for the Web. The universal client comprises any client device used to access applications and/or information from within NCA, such as personal computers, Java and/or Web browser-based clients, mobile devices and network computers.

NCA pluggable cartridges are software programs or components that include applications or components of applications. These components can be written in numerous programming languages such as Java, SQL, C/C++, etc. Software developers can interface with NCA by building these pluggable cartridges. NCA provides for the use of three distinct types of cartridges, including client cartridges, application server cartridges and data cartridges. These cartridges are pluggable into the respectively named tiers provided by NCA, such that the universal data server tier accepts data cartridges, the application server tier accepts application server cartridges and the universal client tier accepts client cartridges.

Client cartridges, for example, allow clients to access applications and information within NCA, and can include user-interface applets and audio/video plugins. Thus, client cartridges contains visualization programming to enhance user presentation services at the client tier level. Application server cartridges contain logic for running and managing one or more applications. Data cartridges contain the data manipulation logic, and can be written in a number of different languages such as SQL, C/C++ or Java. Data cartridges also enable users to create special extended data types such as image, text, or time series data types.

The cartridges are all able to communicate with one another across distributed architectures through the use of a common communications bus known as ICX (InterCartridge Exchange), a common communication layer based on published protocols and standard interfaces. These interfaces include the Internet protocol of IIOP (Internet Inter-ORB Protocol), a protocol that enables browsers and servers to exchange complex objects, and HTTP, which supports text transmissions.

With NCA, a programmer can develop a software cartridge that plugs into a one of the three tiers. Presently, cartridges are only developed for each respective tier without thought to a comprehensive collection of cartridges to easily and readily interface consistently and simultaneously with multiple tiers of the network computing environment. This would yield important advantages such as providing a comprehensive computer-based system that provides ready access and control of acquired data from any outside client location, such as via the Internet.

SUMMARY OF THE INVENTION

According to a preferred embodiment of the present invention, there is provided a computer-based system for enabling remote access and control of a data acquisition system via a multi-tiered computer network. The computer-based system comprises: (a) a data acquisition system comprising a plurality of data acquisition devices connected to the computer network; (b) a database server connected to the computer network; (c) an application server connected to the computer network; (d) a data acquisition server connected to the computer network for storing data acquired from the data acquisition system; (e) two or more client terminals connected to the computer network; (f) a multi-tiered network computing platform distributed across one or more of the servers connected to the computer network, the network computing platform comprising a client tier, an application tier and a data server tier; and (g) one or more client cartridges provided on the client terminals and one or more application cartridges provided on the application server, the cartridges being adapted to interface with the respective client and application tiers to enable the client terminals to access and control the data acquisition system.

Preferably, the cartridges communicate via a common communications bus, such as an ICX bus, and the data acquisition devices comprise data collection readers. In one preferred aspect, the client cartridges are designed to contains a set of consistent, recognizable user-interface characteristics to provide a consistent graphical appearance and feel to the user.

The data acquisition system is desirably stored at a first location remote from the data acquisition server and connected to the computer network via the database server. Also preferable is that the data acquisition system is provided at a first location and the database server is provided at a second location remote from the first location, and at least one of the client terminals is provided at a third location remote from the first and second locations.

Preferably, the computer network comprises at least in part the Internet, or at least the client computers and the data acquisition server are connected to the computer network via the Internet.

The computer-based system also preferably includes a data cartridge provided on the database server adapted to interface with the database server tier. In one aspect of the present invention, the data cartridge is configured to provide data manipulation logic for employee shifts.

With the computer-based system of the present invention, the client and application cartridges are operative to allow a user at a client terminal to perform database manipulation functions on the acquired data stored on the data acquisition server. The client and application cartridges are also operative to allow a user at a the client terminal to initialize and change parameters of one or more of the data acquisition devices.

In another aspect of the present invention, a computer-based method of accessing acquired schedule data over a multi-tiered computer network having a client tier, an application tier and a database tier. Each tier is adapted to interface with one or more respective client cartridges, application cartridges and data cartridges, and the computer network enabling communications among the cartridges. Desirably, the method comprises the steps of: (a) acquiring schedule information through one or more data collection readers; (b) transferring the schedule data from the data collection readers to a data acquisition server; (c) storing the schedule data within the data acquisition server; (d) inputting at a client computer a request for information based on the acquired data, the request being formatted by at least one client cartridge selected from a predetermined selection of available cartridges; (e) transferring from the client computer one or more application commands indicative of the request for information via the computer network to an application server; (f) performing at the application server one or more database manipulation functions on the acquired data by running at least one application program provided by at least one application server cartridge selected from a predetermined selection of available cartridges; and (g) transferring from the application server to the client computer via the computer network information indicative of the results of the database manipulation functions on the acquired data.

DETAILED DESCRIPTION OF PREFERRED EMBODIMENTS

Figure 1:
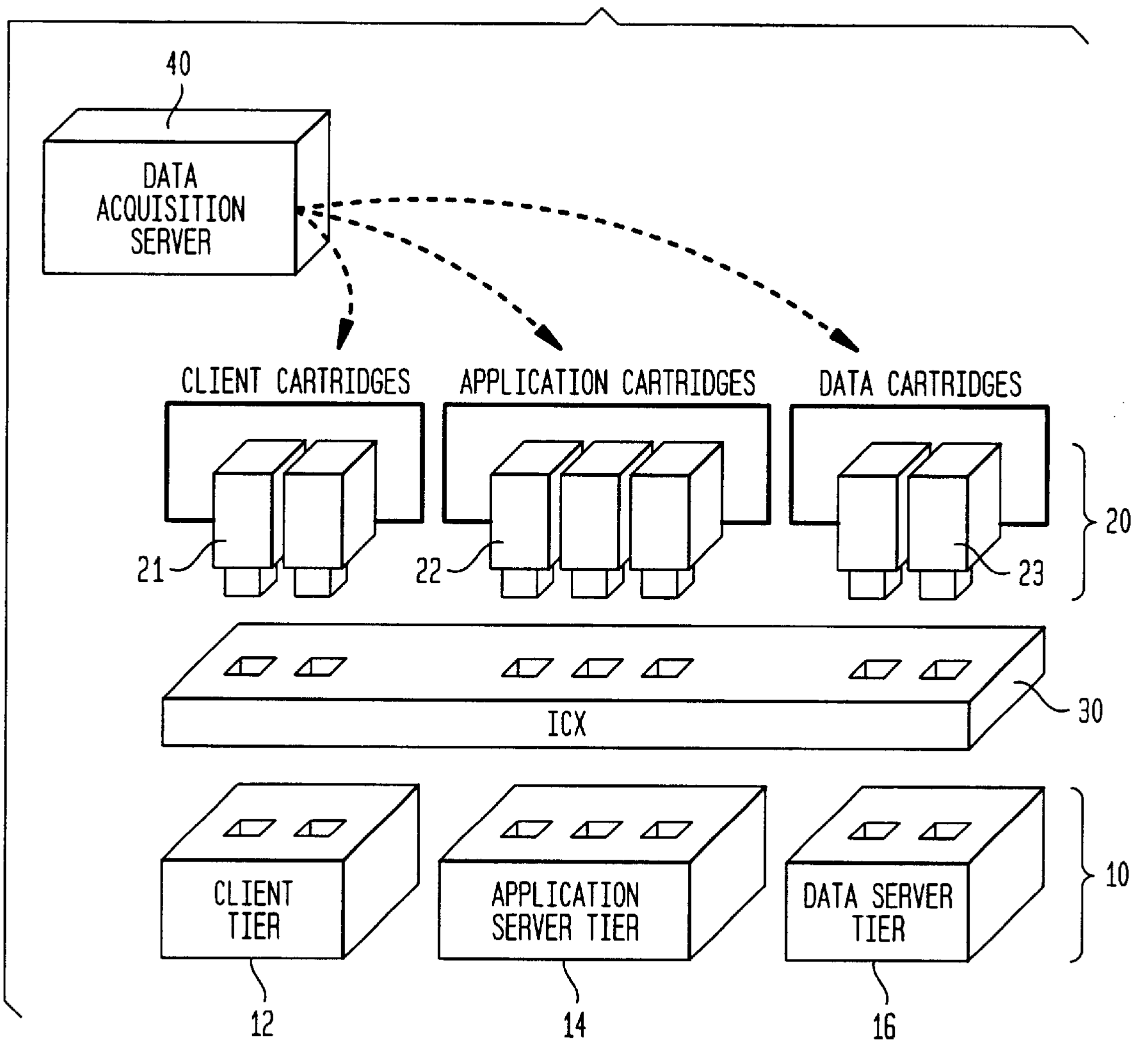
FIG. 1 is a block diagram of how the various client, application and data cartridges interface with their respective tiers of a multi-tiered computing network in accordance with the present invention.

Referring to FIG. 1, the deployment environment of the present invention is illustrated in a multi-tiered network computing environment, shown as environment 10. The multi-tiered network computing environment 10 includes three tiers; namely, a client tier 12, an application server tier 14 and a data server tier 16. Each tier of the network computing environment 10 allows for the ability to accept one or more software modules or cartridges 20. Cartridges 20 are in essence computer programs written in computer languages such as C++ which can be interfaced or "plugged in" to their respective tier. Cartridges 20 include client cartridges 21, application cartridges 22 and data cartridges 23.

With NCA, a multi-tiered network computing environment preferably used by the present invention, communications among the cartridges occurs through use of an ICX (InterCartridge Exchange) bus 30, which is a common communications layer based on common Internet protocols such as IIOP and HTTP. Each cartridge further communicates with a data acquisition server 40, which preferably comprises the Amano CS500N real-time data acquisition server.

Data acquisition systems, which use servers such as the Amano CS500N, are used by many business in the private and public sector for monitoring applications such as monitoring working time and attendance of employees, access control applications (e.g., monitoring access to certain high security rooms), shop floor data collection applications and machine monitoring. These systems include real-time data input devices or data collection readers such as card swipes, data entry readers, turnstiles, garage parking gates, etc.

connected to real-time server units. The server units interface with external systems such as PCs, networks and UNIX systems and can monitor, for example, employee activities at a work site by tracking a plurality of real-time events such as entry and exits through given access doors, turnstiles, vehicle barriers, etc. Such systems can monitor and record numerous single transactions per second and can maintain very large amounts of data for immediate access.

Since the cartridges 20 are software programs, as explained below, the cartridges are stored locally on the respective computers that are a part of the overall networked system for storage, management and manipulation of real-time data coordinated via the real-time data acquisition server 40.

Client cartridges 21 provide the GUI (graphical user interface) front ends such as web-enabled browsers to allow users to access application programs and the underlying data. The client cartridges reside at the client location which can consist of PCs, Java clients, browser-based clients, thin clients, mobile devices, network computers (NCs), etc.

Application cartridges 22, which reside on the application server, provide the code (such as Java code) used to generate the display at the client computer and further provide the software applications which manipulate and evaluate the stored data, such as by providing time and attendance programs, scheduling and access control data programs and ultimately functional processing by utilizing the data acquisitions system. One or more application cartridges 22 can be used to provide applications that use and manipulate the data collected by the data acquisition unit, such as human resource applications (attendance and work-hour monitoring), payroll, project costing, scheduling, personal time and expense software, and work-in-progress and cost management. When the network computing environment comprises Oracle's NCA, application cartridges 22 preferably run on Oracle's application server known as Oracle's Web Application Server.

Preferably, a selection of custom application cartridges can be provided to perform different and separate functions rather than using only a single application cartridge. For instance, for time and attendance systems, specialized application cartridges can be provided such as Daily Edits, Scheduling, Shifts and Payroll. Namely, a Daily Edits cartridge provides access to historical information about employees' working patterns, shifts and hours. A Scheduling cartridge provides access to future scheduling of the employees. For instance, through such a cartridge, an employee may be able to set in advance her vacation time. A Shift cartridge allows manipulation of the shifts available to the employees. A Payroll cartridge provides access to the payment rules of the company. Obviously, other types of application cartridges besides those mentioned above can be developed and used in accordance with the needs of the company using the present invention, and the company need only use and install the cartridges that it needs.

Providing a selection of cartridges is advantageous for various reasons. For instance, because each particular business may not need all possible features, only selected cartridges need be provided thus lowering costs to the business. Further, if newer and better cartridges are developed, they can replace and/or augment older cartridges on an individual basis without the need to replace or rewrite one large application.

The cartridges provided by the present invention can also be optimized to work better and more consistently with one another. For instance, the client cartridges can be offered with consistent recognizable characteristics, across the provided client cartridges, such as a consistent graphical appearance and feel through providing common function keys for look-up, right mouse pop-up windows, etc.

The data cartridges 20 specify data types which can be used by the application cartridges. In one preferred embodiment, the data cartridge defines a data type of "shifts" which represents the working schedule of an employee in terms of: start/end time; regular hours; overtime hours; rotating pattern/rosters; and union rule/contracts. Such shift data cartridge can then be used to represent set-up and business queries of working schedules of employees and predefined relations can be established with other modules in a network computing environment. When the network computing environment comprises Oracle's NCA, data cartridges 23 preferably run on Oracle's universal data sever known as Oracle 8.

Figure 2:
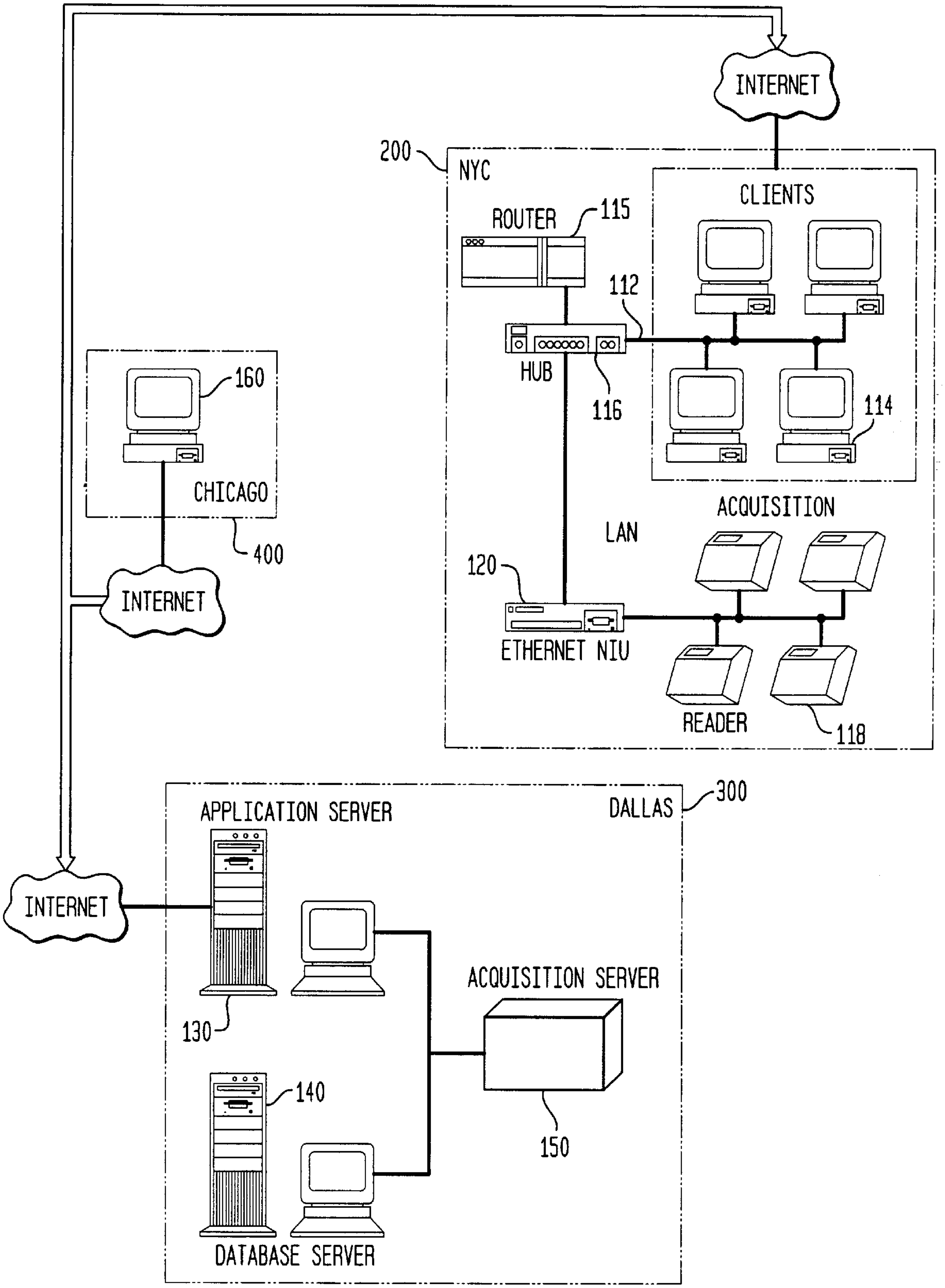
FIG. 2 is a block diagram of the major components of the apparatus for interfacing a data acquisition system with a multi-tiered computing network in accordance with the present invention.

Referring now to FIG. 2, one example of the implementation of the present invention is shown which allows the collection, updating and configuring of the processing of data collected by a data acquisition server. In this example, data acquisition occurs at location 200, which in this example can be at a factory location in New York City. At location 200 there is provided a conventional local area network (LAN) 112 to which is connected the usual network-related devices such as multiple client computers 114, router 115 and hub 116. LAN 112 can comprise twisted pair wires, coaxial cable, fiber optic links or local free space communications of the type commonly used to connect client computer terminals. The client computers 114 can comprise computers such as an Intel-based (IBM-PC and compatible) or Motorola-based (Apple Macintosh, Apple PowerMac) personal computers. Preferably, the client computers include at least an Intel Pentium based (or equivalent) microprocessor, Web browser software, such as Netscape Navigator/Communicator or Microsoft Internet Explorer, and use Microsoft's Windows 95 or NT operating system.

Because data acquisition occurs at location 200, there is also provided multiple input devices 118 such as card swipes, badge readers, etc. connected to the LAN by network interface unit (NIU) 120. Internet connectivity is also provided such that the acquired data may be transmitted over the Internet to any other location connected to the Internet. The connection to the Internet may be through an Internet gateway PC or other typical way of connecting to the Internet such as through a modem and a dial-up account. Other types of networking, such as a WAN (wide area network), can also be used with the present invention instead of or in addition to the Internet.

Although data may be acquired at location 200, the data can be stored and managed at location 300, for instance at a company's corporate headquarters in Dallas, Texas. At location 300 there is provided application server 130, database server 140 and acquisition server 150. Internet connectivity is also provided for the application server 130. Application server 130 comprises one or more computers which provide the ability to run applications and programs which make use of the acquired data as discussed above. Application server 130 may also serve as the Internet gateway PC or a separate gateway PC (not shown) can be provided.

Database server 140 comprises one or more computers or workstations designed and configured to perform queries and data manipulation logic based on commands sent from the application cartridges. Acquisition server 150 handles the data acquired from data acquisition location 200. While acquisition server can comprise one or more PCs or workstation computers, preferably, acquisition server 150 comprises a dedicated server such as the Amano CS500N acquisition server, a custom-built server including basic computer hardware such as a CPUs, data input and output ports, but uses solid state memory, such as static RAM with integrated backup power, rather than traditional hard drive storage.

When the network computing environment comprises Oracle's NCA, application server 30 preferably runs Oracle's Web Application Server software and database server 40 runs Oracle's Oracle8 data server software.

Access to the data and to the applications used to manage and manipulate the data can occur at any client computer running a client cartridge and connected to the Internet, such as at location 400, which can, for instance, be located at a branch office in Chicago, Ill. Computer 160 located at location 400 is connected to the Internet in the conventional manner (e.g., modem, direct connection, dial-up account, etc.) to allow access to the computers and devices at locations 200 and 300.

With the configuration as shown in FIG. 2, it can be seen that time and attendance data can be acquired at a site in New York, stored and managed at a site in Dallas, and accessed and manipulated at a site Chicago. Of course, the application server, database server and acquisition server need not all be located at the same site as shown in FIG. 2 and these servers can be separately located at any site which has connectivity to the Internet or other national or global computer network.

With the present invention, data acquisition servers, such as the Amano CS500N, can effectively participate on a network through the use of multiple software cartridges which interface with the multiple tiers of a cross-platform, multi-tiered network computing environment. The cartridges thus allow a client running a client cartridge on a PC connected to the Internet to launch one or more application cartridges located at a remote application server to perform manipulation of the acquired data (such as time and attendance data) on a remote database server. The client can also collect/update data and even configure the processing of data collected by the data acquisition unit via a universal communications bus based on parameters specified during the network interface cartridge utilization. It is also possible that the client can remotely initialize and change the settings and parameters of input devices 118.

When used in connection with a data acquisition system such as Amano's CS500N, the present invention allows users to collect time, production and other employee and production data from remote sites and across disparate computer operating systems, through a user-friendly interface provided at the client location, such as by using a Web browser. Data collected at one location can be validated online, in real time, in accordance with the most effective business processes within the organization. Thus, companies can optimize the use of data from heterogeneous sources while offering a friendly and familiar user interface through the use of Web browsers.

The present invention helps companies manage employee time and production data more efficiently and cost effectively. For instance, a manufacturer in North Carolina, at 3:00 p.m. in the afternoon, who needs to immediately determine the "up to the minute" total of hours being spent by employees on a component being manufactured in Japan, for an important presentation in 10 minutes, can gain this information at his or her fingertips. The data can be accessed by a remote client terminal through the network computing environment in real time, regardless of the application, business logic or recording mechanisms being employed by the organization located in Japan. This provides real value across all tiers of a network computing environment.

Figure 3:
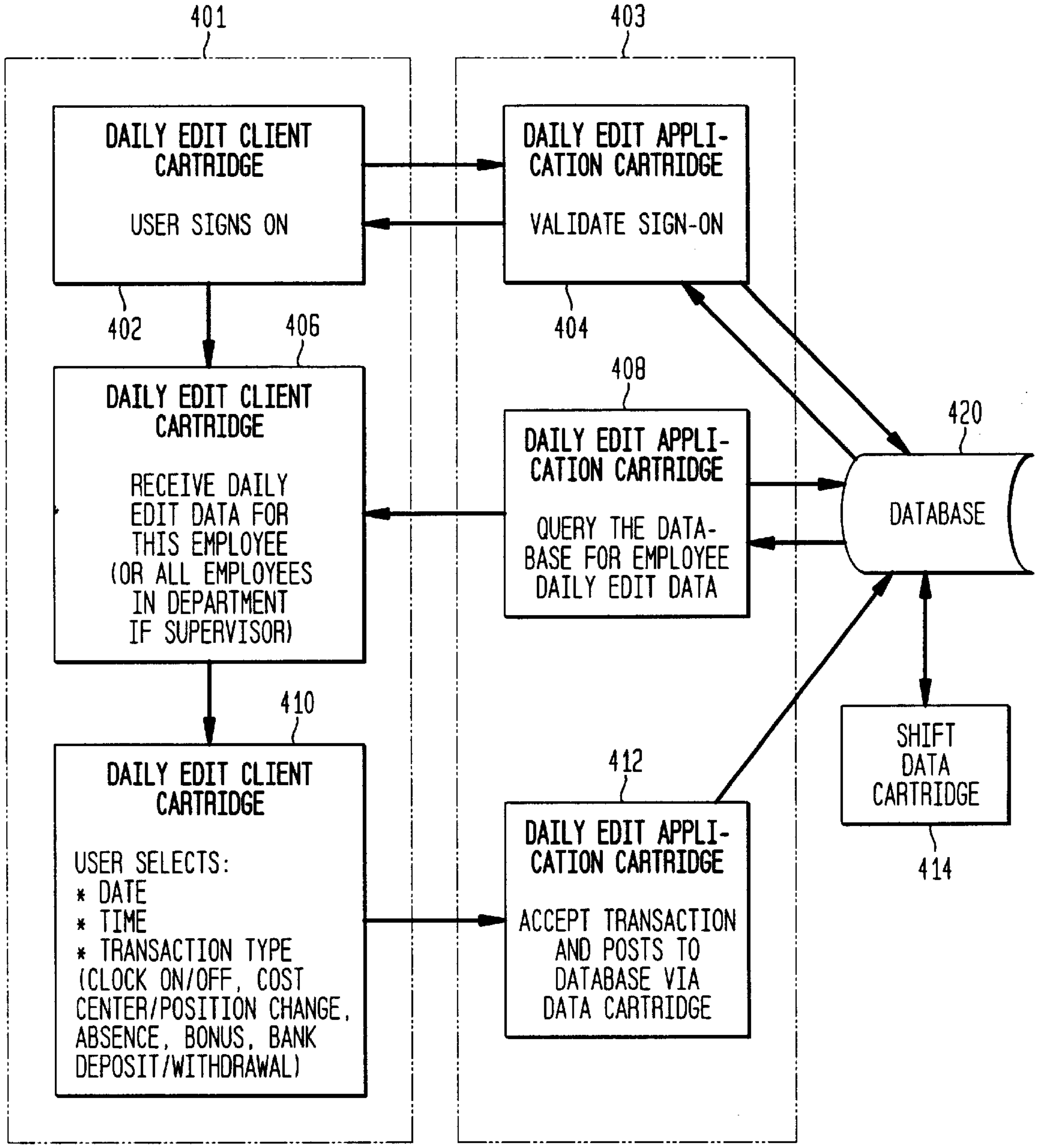
FIG. 3 is a logic flow block diagram of the interaction among "daily edit" cartridges in accordance with the present invention.

Referring now to FIG. 3, a logic flow diagram of the interaction among cartridges in accordance with the present invention is shown. In particular, the flow of a "Daily Edit" function can be seen, which allows the user at the browser location to gain access to and edit historical schedule information of the employees, such as how many hours were worked last week, at what shifts, etc. To achieve the functionality for "daily edits," a Daily Edits Client Cartridge 401 and a Daily Edits Application Cartridge 403 are provided. At step 402, with the Daily Edit Client Cartridge, the user can sign in with a user name and password in the typical fashion. This occurs at the client location. At step 404, the Daily Edit Application Cartridge is accessed at the application server to validate the sign-on to ensure the user has entered the correct information in order to gain access to the database 420. A confirmation signal, for example, can be sent back from the database 420 to the application cartridge and then to the client cartridge to confirm to the user that he or she has successfully logged into the database.

Next, at step 406, the user in this example can retrieve "daily edit data"and see the schedule data for a particular employee (or all employees in a department). Upon making this request at the client location, the Daily Edit Client Cartridge communicates with the Daily Edit Application Cartridge. At step 408, the Daily Edit Application Cartridge receives the request for information from the client and performs a query on database 420 to extract the relevant employee daily edit data. The results of the query are then returned back to the client through the application cartridge.

At step 410, with the Daily Edit Client Cartridge, the client can make changes to the database. For instance, he can changes dates, times and transaction types for each employee. Such transaction types that can be edited may include clock on/off (when the employee arrives and leaves), cost center (if the employee moved to a different project and thus the billing rate changes), position change (the employee moves locations), absence, bonus, and bank deposit/withdrawal (where the employee "banks" hours and can accrue and withdraw extra hours). Upon making the changes, this information is conveyed to the Daily Edit Application Cartridge at step 412 which accepts the edit transaction made and then posts the change to database 420. Also preferably provided is a Shift Data Cartridge 414 which provides a new "shift" data type, and related logic, for storing shift data stored in the database 420.

With the NCA platform, application and client cartridges can be readily developed by taking existing applications and modifying them in order to make them compliant with the NCA architecture based on open standards published by Oracle. To do so, object-oriented programming tools can be used, such as Java Programmer for DB-Toolkit configuration for client cartridges. Cartridges can also be written in multiple languages such as Visual Basic, C/C++, SQL, etc. In addition, Oracle provides software development tools to assist in the transformation of applications to the NCA architecture.

The present invention offers a number of advantages over client/server systems. For instance, through the use of cartridges, the present invention allows multiple client cartridges to be used and interact with one another to form a more intelligent front-end, and multiple applications can be used by the same clients. By contrast, in client/server systems, the client is closed to being used by other applications or other client programs. Thus, client programs need to be reprogrammed to work with other stand-alone client programs and would require two different vendors to develop such programs jointly.

Although the invention herein has been described with reference to particular preferred embodiments, it is to be understood that such embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Moreover, it will be understood that it is intended that the present invention cover various combinations of the features described herein in addition to those specifically set forth in the appended claims.

What is claimed is:

1. A computer-based system for enabling remote access and control of a data acquisition system via a multi-tiered computer network, comprising:

(a) a time and attendance data acquisition system comprising a plurality of time and attendance data acquisition devices, said data acquisition system being connected to the computer network;

(b) a database server connected to the computer network;

(c) an application server connected to the computer network;

(d) a data acquisition server connected to the computer network for storing data acquired from said data acquisition system;

(e) two or more client terminals connected to the computer network;

(f) a multi-tiered network computing platform distributed across one or more of said servers connected to the computer network, said network computing platform comprising a client tier, an application tier and a data server tier; and (g) one or more client cartridges provided on said client terminals and one or more application cartridges provided on said application server, said cartridges being adapted to interface with the respective said client and application tiers to enable said client terminals to access and control said data acquisition system.

2. A computer-based system as claimed in claim 1, wherein said cartridges communicate via a common communications bus.

3. A computer-based system as claimed in claim 2, wherein said common communications bus comprises an ICX bus.

4. A computer-based system as claimed in claim 1, wherein said data acquisition system is stored at a first location remote from said data acquisition server.

5. A computer-based system as claimed in claim 1, wherein said data acquisition devices comprise data collection readers.

6. A computer-based system as claimed in claim 1, wherein said data acquisition server is connected to said computer network via said database server.

7. A computer-based system as claimed in claim 1, wherein said data acquisition system is provided at a first location and said database server is provided at a second location remote from said first location.

8. A computer-based system as claimed in claim 7, wherein at least one of said client terminals is provided at a third location remote from said first and second locations.

9. A computer-based system as claimed in claim 1, wherein said computer network comprises at least in part the Internet.

10. A computer-based system as claimed in claim 1, wherein at least said client computers and said data acquisition server are connected to the computer network via the Internet.

11. A computer-based system as claimed in claim 1, further comprising a data cartridge provided on said database server, said data cartridge being adapted to interface with said database server tier.

12. A computer-based system as claimed in claim 11, wherein said data cartridge is configured to provide data manipulation logic for employee shifts.

13. A computer-based system as claimed in claim 1, wherein said client and application cartridges are operative to allow a user at a said client terminal to perform database manipulation functions on the acquired data stored on said data acquisition server.

14. A computer-based system as claimed in claim 1, wherein said client and application cartridges are operative to allow a user at a said client terminal to initialize and change parameters of one or more of said data acquisition devices.

15. A computer-based system as claimed in claim 1, wherein said at least one client cartridges comprises at least two said client cartridges, each of which contains a set of consistent, recognizable user-interface characteristics to provide a consistent graphical appearance and feel to the user.

16. A computer-based method of accessing acquired schedule data over a multi-tiered computer network having a client tier, an application tier and a database tier, each the tier being adapted to interface with one or more respective client cartridges, application cartridges and data cartridges, and the computer network enabling communications among the cartridges, the method comprising the steps of:

(a) acquiring schedule data through one or more data collection readers of a time and attendance data acquisition system;

(b) transferring the schedule data from the data collection readers to a time and attendance data acquisition server;

(c) storing the schedule data within the data acquisition server;

(d) inputting at a client computer a request for information based on the acquired data, the request being formatted by at least one client cartridge;

(e) transferring from the client computer one or more application commands indicative of the request for information via the computer network to an application server;

(f) performing one or more database manipulation functions at the application server on the acquired data by running at least one application program provided by at least one application server cartridge; and (g) transferring from the application server to the client computer via the computer network information indicative of the results of the database manipulation functions on the acquired data.

17. A method as claimed in claim 16, wherein at least a portion of the schedule data is stored in a predetermined data format specified by at least one data cartridge, and further comprising the step of selecting the stored schedule data for use by at least one of the application cartridges.

18. A method as claimed in claim 16, wherein the each of the cartridges communicate with one another over a common communications interface.

19. A method as claimed in claim 16, wherein the schedule data is transferred from the data collection readers to the data acquisition server over the network.

20. A method as claimed in claim 16, wherein said at least one client cartridge is selected from a predetermined selection of available cartridges.

21. A method as claimed in claim 16, wherein said at least one application server cartridge is selected from a predetermined selection of available cartridges.

22. A method as claimed in claim 16, wherein said at least one client cartridge comprises at least two said client cartridges each of which contains a set of consistent, recognizable user-interface characteristics to provide a consistent graphical appearance and feel to the user.

* * * * *

UNITED STATES PATENT AND TRADEMARK OFFICE

CERTIFICATE OF CORRECTION

PATENT NO. : 6,330,594 B1
DATED : December 11, 2001
INVENTOR(S) : Marius Swart

It is certified that error appears in the above-identified patent and that said Letters Patent is hereby corrected as shown below:

Column 1,
Line 25, "adapted" should read -- adaptation --.

Column 2,
Line 42, "plugins" should read -- plug-ins --.
Line 43, "contains" should read -- contain --.
Line 62, delete the word -- a --.

Column 3,
Line 30, "contains" should read -- contain --.
Line 57, delete "a" (second occurrence).
Line 63, after "database tier" insert -- is provided --.

Column 4,
Line 52, "occurs" should read -- occur --.

Column 6,
Line 17, "Oracle 8" should read -- Oracle8 --.

Column 7,
Line 4, delete the word -- a --.

Column 10,
Line 30, "cartridges" should read -- cartridge --.
Line 36, delete the word -- the --.

Column 11,
Line 3, delete the word -- the --.

Signed and Sealed this

Eleventh Day of June, 2002

*Attest:*

JAMES E. ROGAN

*Attesting Officer* *Director of the United States Patent and Trademark Office*